Patented Nov. 5, 1935

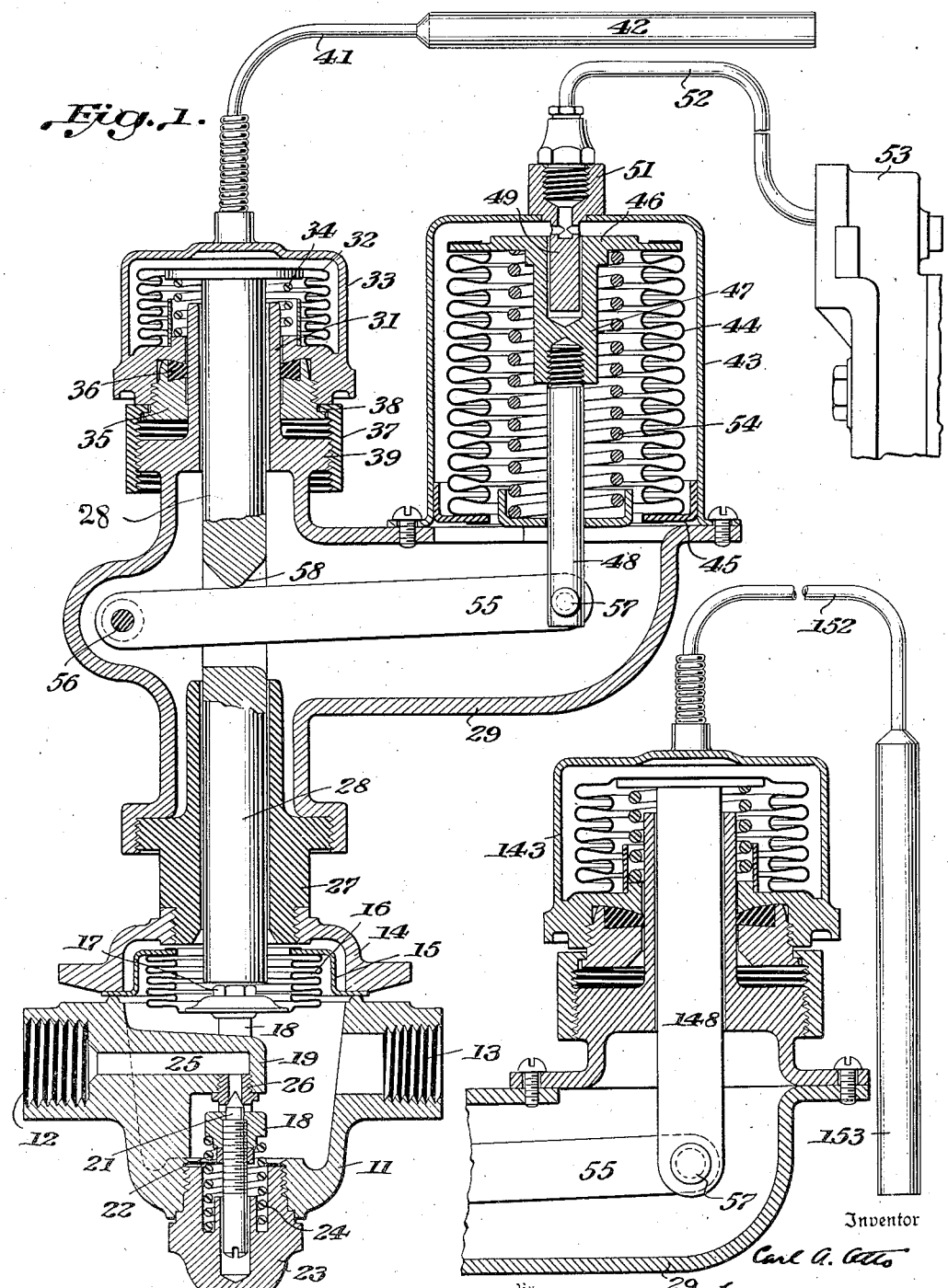

2,019,724

UNITED STATES PATENT OFFICE 2,019,724

REFRIGERATING SYSTEM

Carl A. Otto, Milwaukee, Wis., assignor to Johnson Service Company, Milwaukee, Wis., a corporation of Wisconsin Application September 1, 1934, Serial No. 742,495

12 Claims. (Cl. 62—2)

This invention relates to expansion valves for refrigerating systems and provides a mechanism by which so-called automatic expansion valves may be subjected to a modulating control responsive to the temperature created by the evaporator to which the expansion valve furnishes refrigerant.

A familiar type of automatic expansion valve comprises a needle valve (or the equivalent) controlling flow of refrigerant to the evaporator; spring loading means (commonly adjustable) biasing the valve in a closing direction; a movable abutment subject to evaporator pressure, i. e., the pressure on the discharge side of the valve, such abutment urging the valve in a closing direction; and some type of thermostat subject to the temperature of refrigerant leaving the evaporator and acting through a pressure motor to develop an opening tendency on the valve as such temperature rises.

To control the evaporator in response to temperature in the space cooled by the evaporator, it has been the practice to connect a controlling valve in series with the expansion valve, and in advance thereof, such valve being controlled by a thermostat subject to the temperature of the refrigerated space, the thermostat serving to move the valve in a closing direction on fall of temperature. This arrangement is objectionable because when the controlling valve is more nearly closed than the expansion valve, expansion will occur at the controlling valve, and the expansion valve will frost.

According to the present invention, the thermostat in the refrigerated space acts on fall of temperature to energize normally inactive means, such means when energized acting to develop an additional closing force on the expansion valve.

Stated differently when room temperature falls a room thermostat becomes active to develop an additional closing tendency on the expansion valve itself. Such force varies with the depression of room temperature below the desired value. When room temperature is normal the expansion valve is free to respond to inlet pressure and discharge temperature of the evaporator, its normal mode of operation. When the room thermostat takes control it exercises a modulating action.

Referring to the drawings, preferred embodiments of the inventive concept will now be described.

Fig. 1 is a vertical axial section of an automatic expansion valve having the invention applied by the use of a pneumatic relay room thermostat actuating a bellows motor.

Fig. 2 is a fragmentary view similar to a portion of Fig. 1 showing the substitution for the pneumatic thermostat of an expansible fluid thermostat.

Figure 3:
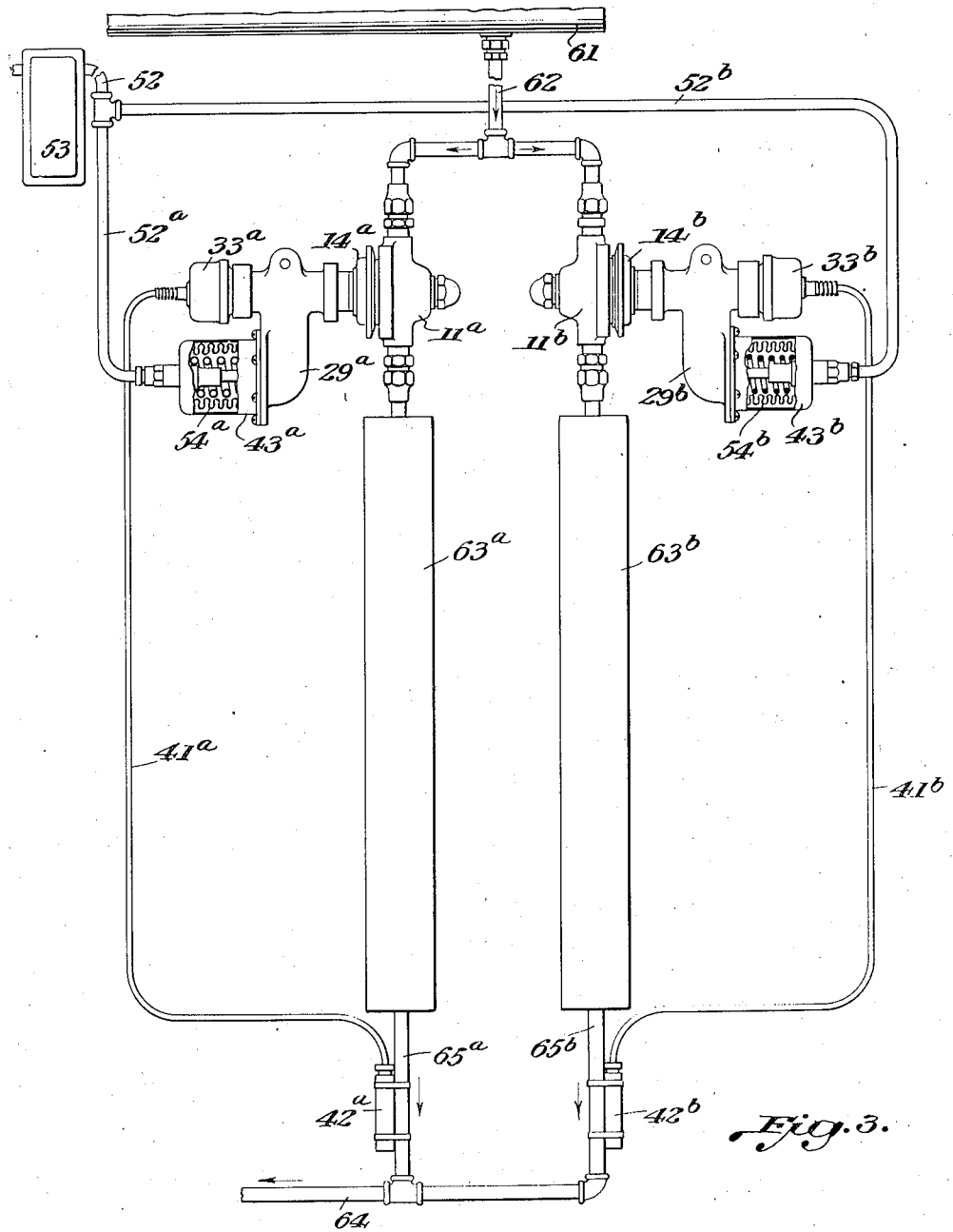
Fig. 3 is a diagram showing how a single room thermostat may be connected to exercise serial graduated control of the expansion valves of two evaporators.

Referring first to Fig. 1, the body of the expansion valve is shown at 11 and has an inlet connection 12 and a discharge connection 13.

Clamped between body 11 and cap 14 is the annular base 15 for the metallic bellows 16. Attached to the center of bellows 16 by nut 17 is the yoke 18 which is offset to clear the seat boss 19 of body 11 and carries the upwardly seating needle expansion valve 21, which is adjustably mounted in the yoke 18 by being threaded therein. A check nut 22 maintains the adjustment.

Valve 21 is guided at its lower end in a recess in the plug 23, which is threaded in an aperture in body 11 and is removable to give access to the valve. Plug 23 also serves as a seat for the coil compression spring 24 which reacts at its upper end against yoke 18 and thus urges valve 21 in a closing direction.

The boss 19 is provided with a passage 25 leading from inlet 12 to seat bushing 26 with which valve 21 coacts.

Threaded into cap 14 is a neck 27 formed with a guideway for the push rod 28 and threaded on neck 27 is a housing 29 which supports the two thermostat motors and encloses the moving parts of their force transmitting mechanism, as will be explained.

The push rod 28 is guided at its upper end in a tubular extension 31 of housing 29. At its lower end it is in thrust engagement with nut 17 and yoke 18 and at its upper end is in thrust engagement with bellows 32 of a thermostat motor. This motor is made up of shell 33, the bellows 32 sealed thereto and enclosed thereby, and a coil compression spring 34 tending to urge the bellows upward. The shell 33 is threaded to a clamping ring 35 which encircles extension 31 and produces a seal by means of gasket 36. The whole motor is adjustable vertically by a nut 37 which is swiveled at 38 between body 33 and ring 35, and is threaded on a boss 39 on housing 29.

The space between bellows 32 and shell 33 is connected by a flexible tube 41 with thermostatic bulb 42 containing a thermally expansible fluid. Bulb 42 is subjected to the temperature of refrigerant leaving the evaporator fed by the expansion valve, and develops an opening tendency on the valve in response to rise of temperature.

Also mounted on housing 29 is a second thermostat motor. This comprises a cup-like shell 43, a metallic bellows 44 enclosed thereby and attached at its lower end to an annulus 45 which is also attached to shell 43. The bellows 44 carries at its upper end a head 46 having a hub 47 to which link 48 is attached. The hub 47 has a guideway for pilot 49 formed as a part of the nipple 51 which, with pipe 52, connects the motor with the branch line connection of a pneumatic relay thermostat 53.

A spring 54 urges head 46 upward and exerts a valve closing tendency on valve 21 by urging push rod 28 upward in opposition to bellows 32. The force transmitting connection comprises lever 55 fulcrumed at 56 and pinned to link 48 at 57, the lever passing through a slot in push rod 28 and engaging the V-shaped thrust boss 58. The slot in the push rod 28 is of such length as to afford a substantial clearance beneath the lever 55 so that this lever never reacts downward upon the push rod 28.

The thermostat 53 may take various forms but is illustrated as of the type described and claimed in the patent to Otto, No. 1,500,260, granted July 8, 1924. It is subject to the temperature in the space cooled by the evaporator which the valve 21 feeds and acts to increase pressure in pipe 52 as temperature rises.

The basic condition is that the thermostat shall exert an increasing closing tendency on valve 21 as temperature in the refrigerated space falls below a desired minimum. Above that minimum it is desirable that the thermostat 53 and motor 43—44 leave the valve under the joint control of bellows 16 and 32 alone. This last condition is attained in Fig. 1 by the one-way thrust relation between lever 55 and push rod 28. In Fig. 2 the possible substitution of another type of thermostat for the pneumatic relay thermostat 53 and motor 43—44 is indicated. Here a bellows motor, indicated generally by the numeral 143, thermostatic bulb 153 and connecting tube 152 are used. The construction of parts 143, 152, 153, is essentially identical with parts 31 to 42 of Fig. 1, so the description of details is not repeated. The expansible fluid in bulb 153 is chosen according to the temperature to be maintained and develops a pressure in motor 143 on rising temperature. The bellows of motor 143 acts through push rod 148 on lever 55, and the action is similar to that already described with reference to Fig. 1.

Fig. 3 shows a single pneumatic thermostat exercising serial modulating control on the expansion valves of two evaporators. The receiver 61 supplies liquid refrigerant through branched liquid line 62 and two expansion valves 11a and 11b to two evaporators 63a and 63b which are connected to suction line 64 by branches 65a, 65b.

Major elements of the structure shown in Fig. 1 are indicated in Fig. 3 by the same reference numerals used in Fig. 1 but differentiated by the letters a and b. Thus the bulbs 42a and 42b are clamped to the suction branches 65a and 65b respectively, while the single thermostat 53, identical with thermostat 53 of Fig. 1, has a branch line 52 which leads by way of 52a and 52b to the motors 43a and 43b respectively. The expansion valves are differentiated only in the relative strengths of spring 54a of one and 54b of the other. Thus as thermostat 53 changes branch line pressure it first adjusts one valve and then the other. Preferably adjustment of the second commences at the limit of adjustment of the first, but various relations are possible by choice of the relative spring strengths, and under particular conditions one or another relation may be preferable.

Various types of thermostat capable of developing fluid pressures which vary as temperatures rise or fall, may be used, and the motor elements of the thermostats can be variously related to the valve to compensate for diverse characteristics of thermostats, some of which develop wider pressure variations per degree than others, and some of which are reverse acting, i. e. reduce pressure on rise of temperature instead of increasing it.

Broadly stated, the invention contemplates normal control of the expansion valve in response to evaporator pressure acting to close the valve, and evaporator discharge temperature acting to open the valve on rise of temperature. Superposed on this is a secondary control acting to close the valve on fall of temperature in the refrigerated space. Preferably this secondary control is wholly inactive above a given temperature and increasingly active as temperature is reduced below such given temperature. A wide range of mechanisms which will meet these requirements may be evolved and are within the broad scope of the invention.

What is claimed is:—

1. The method of regulating an expansion valve to control a space-cooling evaporator which comprises varying the opening of said valve in response to the resultant of three forces, namely, a closing force proportional to evaporator pressure, an opening force which increases with evaporator discharge temperature, and a closing force which increases as space temperature falls.

2. The method of regulating an expansion valve to control a space cooling evaporator, which comprises varying the opening of said valve in response to the resultant of a closing force proportional to evaporator pressure, an opening force which increases with evaporator discharge temperature, and a closing force which is normally zero but becomes effective at, and increases as space temperature falls below, a chosen minimum value.

3. In a cooling device, the combination of an evaporator; a valve controlling the supply of volatile refrigerant thereto; a movable abutment subject to evaporator pressure and urging said valve in a closing direction; a thermostat subject to temperature of refrigerant at the evaporator discharge; means controlled by said thermostat serving to exert on said valve an opening force which increases with temperature; a thermostat subject to temperature of a medium cooled by said evaporator; and means controlled by the last named thermostat and serving to exert on said valve a closing force which increases as the temperature of said medium falls.

4. In a cooling device, the combination of an evaporator; a valve controlling the supply of volatile refrigerant thereto; a movable abutment subject to evaporator pressure and urging said valve in a closing direction; a thermostat subject to temperature of refrigerant at the evaporator discharge; means controlled by said thermostat serving to exert on said valve an opening force which increases with temperature; a thermostat subject to temperature of a medium cooled by said evaporator; means controlled by the last-named thermostat and serving to exert on said valve a closing force which increases as the temperature of said medium falls; and loading means for biasing said valve in a closing direction.

5. In a cooling device, the combination of an evaporator; a valve controlling the supply of volatile refrigerant thereto; a movable abutment subject to evaporator pressure and urging said valve in a closing direction; a thermostat subject to temperature of refrigerant at the evaporator discharge; means controlled by said thermostat serving to exert on said valve an opening force which increases with temperature; a thermostat subject to temperature of a medium cooled by said evaporator; and means controlled by the last-named thermostat and initially effective at a chosen minimum temperature of said medium to exert on said valve a closing force which increases as the temperature of said medium falls below said minimum.

6. In a cooling device, the combination of an evaporator; a valve controlling the supply of volatile refrigerant thereto; a movable abutment subject to evaporator pressure and urging said valve in a closing direction; a thermostat subject to temperature of refrigerant at the evaporator discharge; means controlled by said thermostat serving to exert on said valve an opening force which increases with temperature; a thermostat subject to temperature of a medium cooled by said evaporator; means controlled by the last-named thermostat and initially effective at a chosen minimum temperature of said medium to exert on said valve a closing force which increases as the temperature of said medium falls below said minimum; and loading means for biasing said valve in a closing direction.

7. In an expansion valve the combination of a valve; a movable abutment subject to pressure on the discharge side of the valve and urging said valve in a closing direction; and two thermally responsive motors in opposed thrust relation with each other, operatively related with said valve to control the movements thereof.

8. In an expansion valve, the combination of a valve; a movable abutment subject to pressure on the discharge side of the valve and urging said valve in a closing direction; two thermally responsive motors in opposed thrust relation with each other, operatively related with said valve to control the movements thereof; and spring means biasing said valve in a closing direction.

9. In an expansion valve, the combination of a valve; a movable abutment subject to pressure on the discharge side of the valve and urging said valve in a closing direction; a shiftable member capable of exerting a one-way opening thrust on said valve; and two thermally responsive motors in opposed one-way thrust engagement with said shiftable member.

10. In an expansion valve, the combination of a valve; a movable abutment subject to pressure on the discharge side of said valve and urging said valve in a closing direction; a thermostatically actuated motor urging said valve in an opening direction; and a second thermostatically actuated motor having a one-way force transmitting connection with said valve and arranged to exert a closing force thereon when subject to temperature below a chosen minimum.

11. In a cooling device, the combination of an evaporator; an expansion valve controlling the supply of volatile refrigerant thereto, said expansion valve comprising means responsive to evaporator pressure on the discharge side of the expansion valve tending to close the valve, and means responsive to the temperature conditions of the refrigerant at the discharge of the evaporator tending to open the valve in response to increase of refrigerant temperature; a thermostat subject to the temperature of a medium cooled by said evaporator; and means controlled by said thermostat and serving to exert on said valve a closing force which increases as the temperature of said medium falls.

12. In a cooling device, the combination of an evaporator; an expansion valve controlling the supply of volatile refrigerant thereto, said expansion valve comprising means responsive to evaporator pressure on the discharge side of the expansion valve tending to close the valve, and means responsive to the temperature conditions of the refrigerant at the discharge of the evaporator tending to open the valve in response to increase of refrigerant temperature; a thermostat subject to the temperature of a medium cooled by said evaporator; and means controlled by said thermostat and initially effective at a chosen minimum temperature of said medium to exert on said valve a closing force which increases as the temperature of said medium falls below said minimum.

CARL A. OTTO.